US012090114B2

(12) United States Patent
Wilkens

(10) Patent No.: US 12,090,114 B2
(45) Date of Patent: Sep. 17, 2024

(54) WALKING AID WITH FOLD-OUT SUPPORT LEGS FOR SITTING DOWN

(71) Applicant: Patrick Wilkens, Bremen (DE)

(72) Inventor: Patrick Wilkens, Bremen (DE)

(73) Assignee: Patrick Wilkens, Bremen (DE)

( * ) Notice: Subject to any disclaimer, the term of this patent is extended or adjusted under 35 U.S.C. 154(b) by 193 days.

(21) Appl. No.: 17/612,800

(22) PCT Filed: Jul. 10, 2020

(86) PCT No.: PCT/EP2020/069624
§ 371 (c)(1),
(2) Date: Nov. 19, 2021

(87) PCT Pub. No.: WO2021/005228
PCT Pub. Date: Jan. 14, 2021

(65) Prior Publication Data

US 2022/0218554 A1 Jul. 14, 2022

(30) Foreign Application Priority Data

Jul. 11, 2019 (EP) .................................... 19185669

(51) Int. Cl.
*A61H 3/02* (2006.01)
*A61H 3/00* (2006.01)

(52) U.S. Cl.
CPC ..... *A61H 3/0288* (2013.01); *A61H 2003/006* (2013.01); *A61H 2201/0161* (2013.01);
(Continued)

(58) Field of Classification Search
CPC . A45B 1/00; A61H 2003/0272; A61H 3/0244
See application file for complete search history.

(56) References Cited

U.S. PATENT DOCUMENTS 245,020 A * 8/1881 Rushforth ................ A45B 1/00
248/435
345,852 A * 7/1886 Leermo .................... A45B 5/00
248/155.2
(Continued)

FOREIGN PATENT DOCUMENTS

CN 206151998 5/2017
CN 206438743 8/2017
(Continued)

OTHER PUBLICATIONS

International Search Report and Written Opinion for PCT Application No. PCT/EP2020/069624, mailed Sep. 18, 2020, 13 pages.
(Continued)

*Primary Examiner* — Noah Chandler Hawk
(74) *Attorney, Agent, or Firm* — Ganz Law, PC

(57) ABSTRACT

A walking aid for taking up a deployment supported force for supporting a person using the walking aid, including a support upper part for engaging around the person, a shaft and a support foot arranged at a lower end of the shaft and having multiple swivelable support legs which can be moved between a storage position in which they are folded out from one another at a predefined angle and the walking aid can be set down on the ground, and a use position in which the support legs are folded together and arranged next to one another and the walking aid can be used, characterized in that the support legs are swivelably retained at a lower end of the shaft, and in that they are designed for taking up the deployment supported force in the use position.

11 Claims, 7 Drawing Sheets

(52) U.S. Cl.
CPC ................ *A61H 2201/0173* (2013.01); *A61H 2201/1215* (2013.01); *A61H 2201/1436* (2013.01); *A61H 2201/1635* (2013.01); *A61H 2201/1676* (2013.01)

(56) References Cited

U.S. PATENT DOCUMENTS

| | | | | | |
|---|---|---|---|---|---|
| 478,460 | A * | 7/1892 | Potter | A45B 1/00 | 135/66 |
| 4,091,828 | A * | 5/1978 | Jorgensen | A61H 3/02 | 135/66 |
| 6,192,908 | B1 * | 2/2001 | Smith | A45B 5/00 | 248/155.2 |
| 6,651,684 | B2 * | 11/2003 | Spitzer | A45B 1/00 | 135/77 |
| 7,219,679 | B2 * | 5/2007 | Hsu | B26B 13/24 | 135/65 |
| 7,434,592 | B2 * | 10/2008 | Larson | A61H 3/0277 | 482/67 |
| 8,464,737 | B2 * | 6/2013 | La Chimia | A61H 3/0244 | 135/84 |
| 9,468,272 | B1 * | 10/2016 | Hyde | A45B 9/04 | |
| 2017/0196322 | A1 | 7/2017 | Denmark | | |

FOREIGN PATENT DOCUMENTS

| | | | | |
|---|---|---|---|---|
| DE | 20018883 | | 2/2001 | |
| EP | 3673885 | A1 * | 7/2020 | A45B 9/04 |
| JP | 2005176983 | | 7/2005 | |
| JP | 2009195396 | | 9/2009 | |

OTHER PUBLICATIONS

Extended European Search Report for European Application No. 19185669.9, mailed Dec. 18, 20219, 6 pages.

Translation of Search Report for Chinese Application No. 202080050410.0, mailed Aug. 22, 2023, 3 pages.

* cited by examiner

WALKING AID WITH FOLD-OUT SUPPORT LEGS FOR SITTING DOWN

BACKGROUND

The invention relates to a walking aid for taking up a supporting force in order to support a person who is using the walking aid, with a support upper part serving for the person to engage with, a shaft, a support foot arranged at a lower end of the shaft, and several pivoting support legs which can be moved between a setting-down position, in which they are folded out at a predefined angle and in which the walking aid can be set down on the ground, and a position of use, in which the support legs are folded together and arranged adjacent to one another and the walking aid can be used.

Such a walking aid with support legs for setting down when it is not in use is known in numerous embodiments, for example from DE 20 2016 006 146 U1. In the case of this and other similar embodiments, support legs are provided at the lower end of the walking aid, which can be folded out or extended by an appropriate mechanism and which, as a supplementary to the support foot that is present in any case or just on their own, serve to allow the walking aid to be set down in a standing position without the risk of it falling over and posing an accident hazard as it lies on the ground.

The familiar arrangements of support legs at the lower end of a walking aid are elaborate and voluminous in terms of design, and lend the walking aid a complicated and inelegant appearance. Moreover, the actuation technology is frequently susceptible to faults and soiling.

SUMMARY

The task of the invention is to provide a walking aid of this type with the aim of improving it in respect of the aforementioned problems.

In certain embodiments, the inventive subject matter is directed to a walking aid for taking up a deployment supported force for supporting a person using the walking aid, comprising a support upper part for engaging around the person, a shaft and a support foot arranged at a lower end of the shaft and having multiple swivelable support legs which can be moved between a storage position in which they are folded out from one another at a predefined angle and the walking aid can be set down on the ground, and a use position in which the support legs are folded together and arranged next to one another and the walking aid can be used, characterized in that the support legs are swivelably retained at a lower end of the shaft, and in that they are designed for taking up the deployment supported force in the use position.

The support foot can be divided into several support legs, preferably into three or four, which are held on the shaft in a pivoting manner and which can brought into either the folded-out setting-down position or into the folded-up position of use.

The support foot can have a length or height that is between 5% and 30% of the overall length or height of the walking aid, preferably between 10% and 20%.

For preference, all the support legs are of the same design. Expediently, each support leg is designed to take up an equal support force which corresponds to at least a proportion of the support force which results from the number of support legs. For reasons of safety, it can be envisaged that each support leg on its own is designed to take up the full bracing and supporting force.

A first locking device can be envisaged in order to lock the support legs with one another in the position of use and/or to lock them with the shaft, in order to ensure that the support legs or an individual support leg cannot inadvertently fold out if a load acts on a lower end of a support leg, crosswise to a longitudinal axis of the shaft.

The first locking device can be activated automatically as soon as the support legs have been brought into the position of use.

Furthermore, a second locking device can be envisaged, in order to lock the support legs in the setting-down position between one another and/or with the shaft, in order to prevent an inadvertent movement of one or more support legs, for example a movement to fold them in towards the position of use. The second locking device can be activated automatically as soon as the support legs have been brought into the setting-down position.

A limit stop, with which the predefined angle is set, can be arranged between each support leg and the shaft. The limit stop can limit an opening movement of one or all support legs in the direction towards the setting-down position.

Each support leg can be held on the shaft such that it can be pivoted around a pivot axis that runs crosswise to a longitudinal axis of the shaft. Alternatively, a flexible linkage between an upper end of a support leg and the shaft can be envisaged, for example connection elements consisting of metal or flexible plastic, between an upper end of a support leg and the shaft, through which likewise a pivoting connection is formed. In a further development of this idea, the support legs can, overall, consist of a flexible material and at their upper ends they can have a fastening section which can be flexibly deflected, and with which they are held on the shaft in a pivoted manner. In such a case, a support leg is formed in one piece with an articulated connection section. The connection section can be designed in the manner of a spring, and can be pre-tensioned such that the support legs, in a relaxed state, assume the setting-down position, and can be brought into the position of use against a spring-like restoring force, or vice versa.

In any case, as an alternative or in addition to an elastic or flexible property of the support legs, springs can be envisaged which act in each case between a support leg and the shaft, or one spring between all the support legs or between all the support legs and the shaft, in order to pre-tension the support legs either into the position of use or into the setting-down position.

For example, torsion springs can be envisaged which can be arranged around the pivot axes, which act as bearings for the support legs on the shaft.

For preference, the invention envisages that arranged on a lower end section of the shaft is a sliding sleeve which can be moved in the longitudinal direction of the shaft, and which in the position of use at least partially overlaps the support legs from the outside and holds them in the position of use, and in the setting-down position as opposed to the position of use it is displaced in the direction of the support upper part and releases the support legs so that they can fold out.

An electric motor can be arranged in or on the shaft, as a drive element for the support legs and/or the sliding sleeve, being in drive connection with the support legs, in particular with the sliding sleeve, in order to move the support legs directly between the position of use and the setting-down position, and/or in order to displace the sliding sleeve between a position that at least partially overlaps the support legs or one that releases them. It can be envisaged that the support legs can be brought into the position of use, through the displacement of the sliding sleeve into the position in which it at least partially overlaps the support legs. Conversely, for preference it is envisaged that when the sliding sleeve is displaced by means of one or more spring(s) into the position that releases the support legs, the support legs can be brought into the setting-down position.

The drive connection can be formed by a crank mechanism with a first crank arm on a rotating shaft of the electric motor and a second crank arm which is connected in an articulated manner with the first crank arm, and which is articulated on the sliding sleeve.

Expediently, a battery and operating elements are accommodated in the support upper part.

The support legs can be articulated on a cylindrical bearing element that is set into a lower, hollow end section of the shaft.

The length of the shaft can be adjusted telescopically in a familiar manner, wherein individual shaft elements can be adjusted relative to one another, in an infinitely variable manner or in predetermined steps.

The support upper part can be designed either as an elbow crutch with a forearm support and a hand grip or alternatively as an axillary crutch with an axilla support and a hand grip.

An operating element, for example a press button, for triggering a movement of the support legs into the position of use or setting-down position can be arranged on or in the hand grip.

An inductive charging unit for the wireless charging of the battery can be arranged on or in the walking aid, for example in the area of the support upper part or in the area of the shaft or the support legs.

It can be envisaged that held on the lower end of the shaft is a central reinforcement element which, in the position of use, is situated centrally between the support legs.

BRIEF DESCRIPTION OF DRAWINGS

Further advantages and features of the invention result from the following description of an embodiment, wherein reference is made to a drawing, in which.

DETAILED DESCRIPTION

Figure 1A:
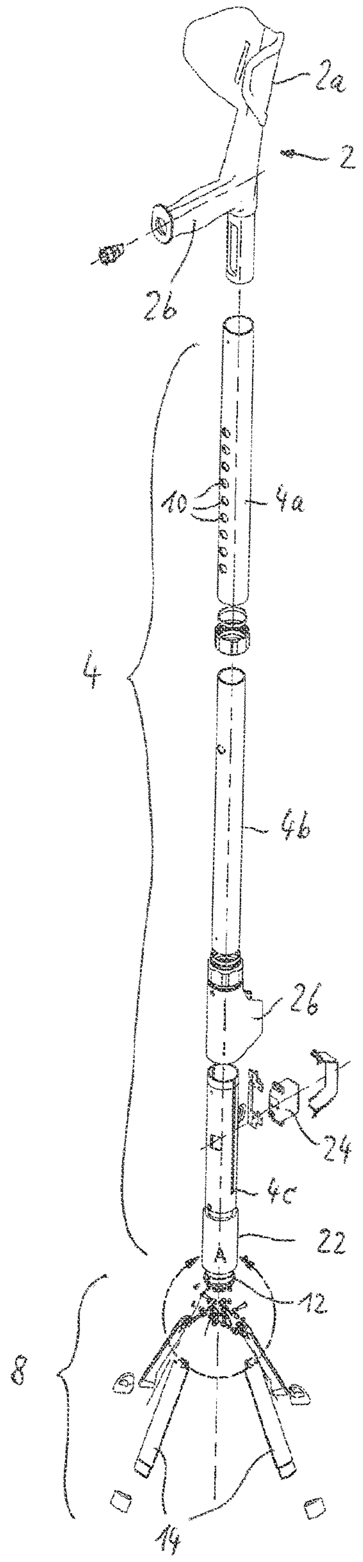
FIGS. 1*a* and 1*b* show an exploded perspective view or side view of a walking aid according to the invention.
Figure 10A:
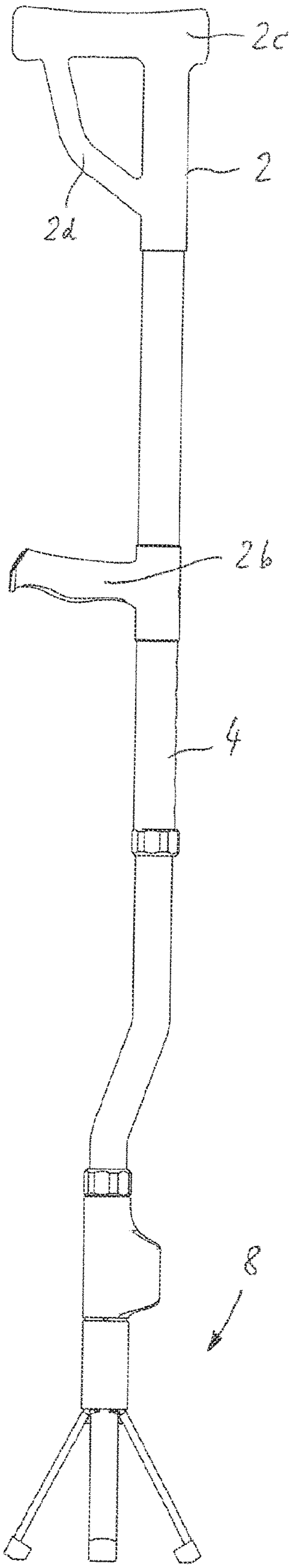
Figure 10B:
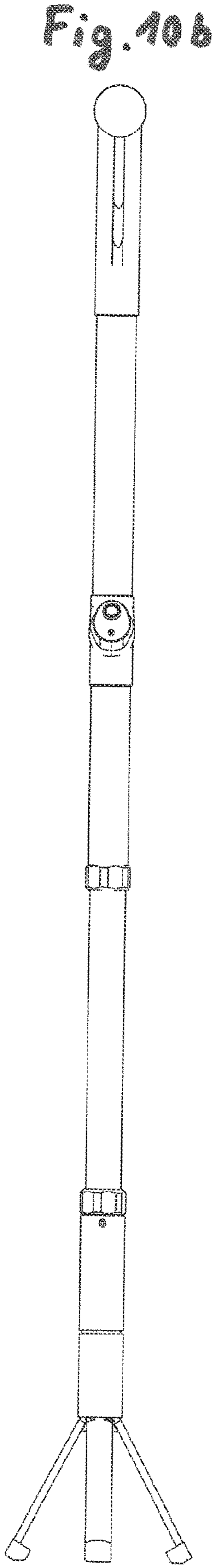
Figure 10C:
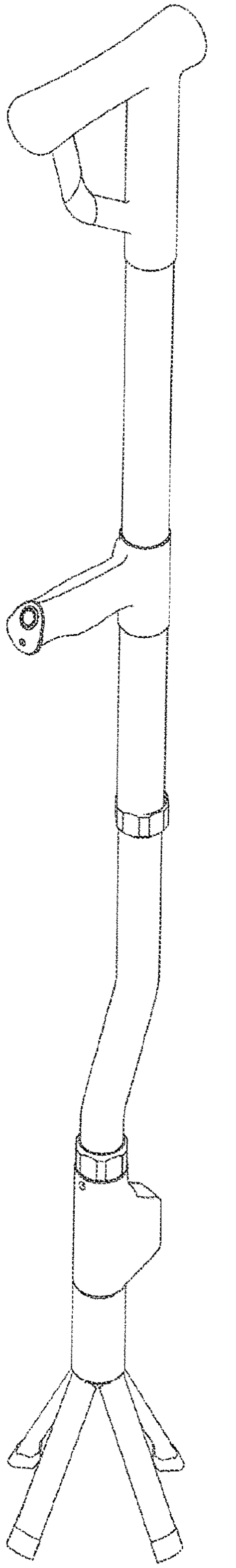

FIGS. 1*a*, *b* show a walking aid according to the invention, which is shown disassembled into its individual parts, with a support upper part 2, a shaft 4 consisting of several parts, and a support foot 8. In this example, the support upper part 2 is shown as an elbow crutch with a forearm support 2*a* and a hand grip 2*b*. Alternatively, the support upper part 2 could be designed as an axillary crutch ("American crutch"), as shown in FIGS. 10*a-c*, with an essentially horizontal, slightly curved axilla support 2*c*, a horizontal hand grip 2*b* arranged below that, and a strut 2*d* that extends laterally from the shaft and bears one end of the axillary crutch, with the other end of the axilla support resting on the shaft 4. As a further alternative, not shown, two laterally projecting struts can be envisaged instead, which bear the axilla support at the top and converge at the bottom and are connected to the shaft, with the hand grip then being arranged centrally between the struts, below the axilla support.

In the variant that is shown, the shaft 4 consists of three part-sections: an upper shaft section 4*a*, a middle shaft section 4*b* and a lower shaft section 4*c*. The support upper part 2 is connected to the upper shaft section 4*a*, for example by means of screws or adhesive bond, and the upper shaft section 4*a* is connected to the middle shaft section 4*b* such that the length can be adjusted telescopically in an essentially familiar manner, wherein snap-in holes 10 are provided on the upper shaft section 4*a*, in order to enable a snap-in projection (not shown) that is held in a sprung manner on the middle shaft section 4*b* to engage with one of the snap-in holes 10, and to fix the two shaft sections 4*a*, 4*b* in a desired position relative to one another.

The middle shaft section 4*b* is firmly screwed to the lower shaft section 4*c*.

Figure 8:
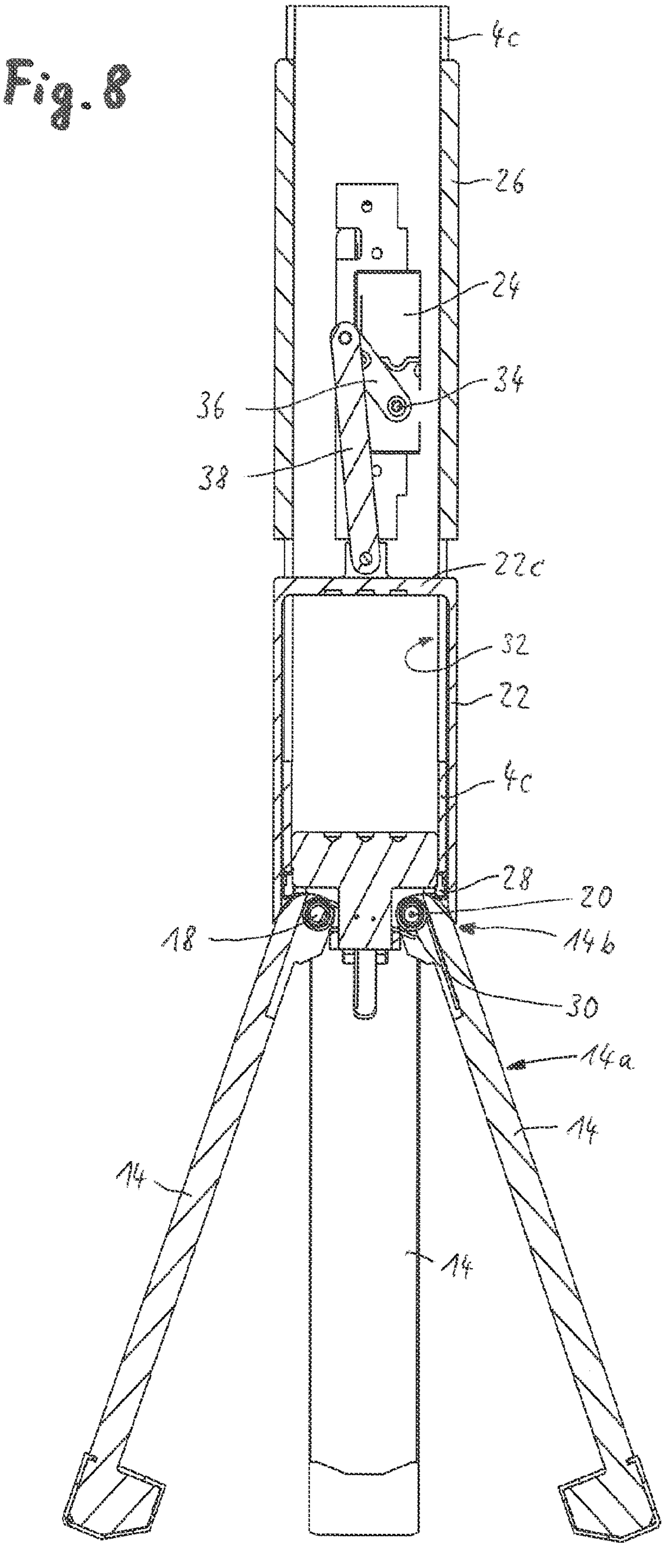
FIG. 8 shows a similar view to FIG. 7, wherein the support legs are to some extent moved in the direction towards the position of use.
Figure 9:
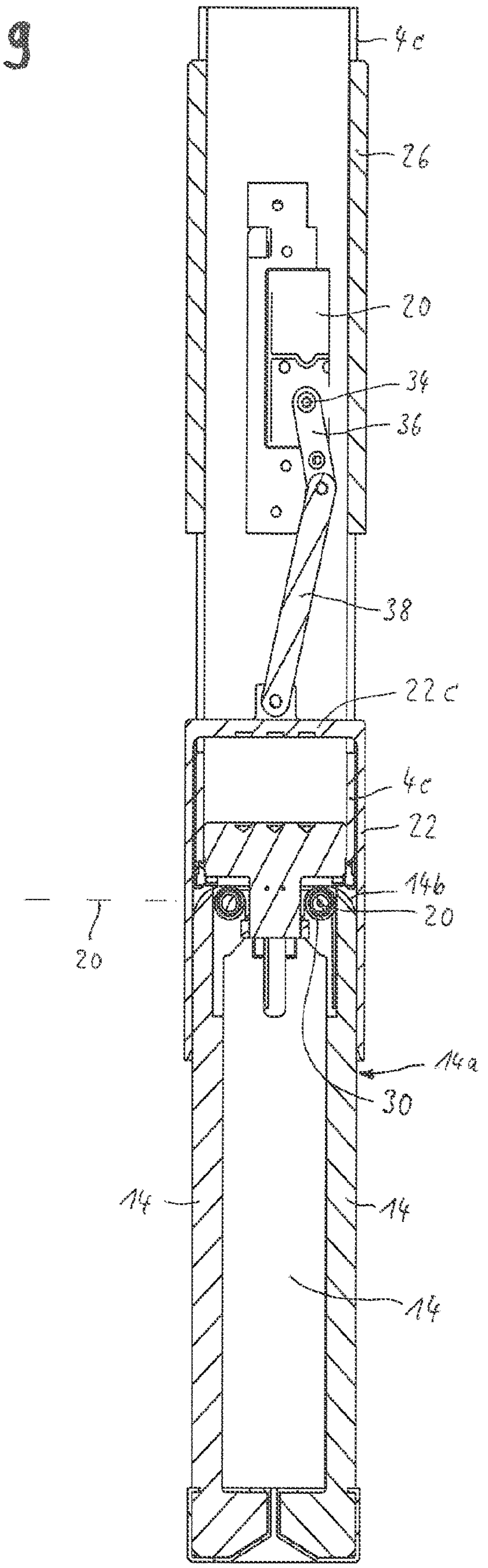
FIG. 9 shows a view similar to FIG. 8, wherein the support legs are in the position of use, and FIGS. 10*a*, *b* and *c* show views of a walking aid designed as an axillary crutch.

Set into a lower end of the lower shaft section 4*c* is a cylindrical bearing element 12 that is firmly screwed to the lower shaft section 4*c*. On the bearing element 12, several support legs 14, four in the embodiment shown here, are borne in a pivoting manner. In each case, bearing is effected by means of a cylindrical bearing journal 18 which is arranged crosswise to a longitudinal axis 4*d* of the shaft, and which is accommodated in corresponding locating holes in the bearing element 12, so that pivot axes 20 which are set by the bearing journals 18, and around which the support legs 14 can be pivoted, run crosswise to the longitudinal axis 4*d* and are unchanging and fixed relative to the shaft or at least relative to the lower shaft section 4*c*. FIGS. 8 and 9 show the pivot axes 20, wherein in FIG. 9, additionally the pivot axis 20 of the support leg 14 situated at the back in the direction of viewing is indicated as a broken line.

In the example shown, the lower shaft section 4*c* is designed as a cylindrical tube, wherein on the lower shaft section 4*c*, a sliding sleeve is held such that it can be slid along the longitudinal axis 4*d*, this sleeve being in drive connection with a drive motor 24 which is fitted in or on the lower shaft section 4*c*, in an upper area of the lower shaft section 4*c*, at a distance from the bearing element 12. In the embodiment shown, because of its size the drive motor 24 is fitted outside the lower shaft section 4*c* and is covered by a motor cover 26. The sliding sleeve 22 has an inner diameter that corresponds to an outer diameter of the lower shaft section 4*c*.

Figure 6:
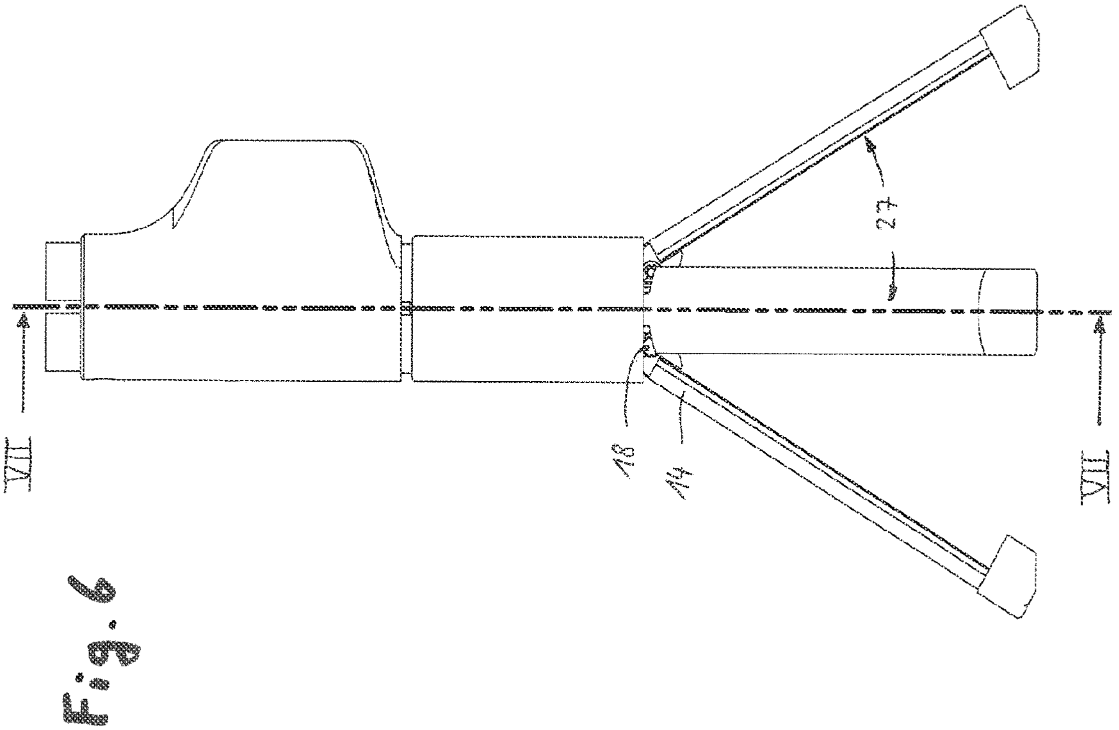
FIG. 6 shows a side view of the area according to FIGS. 3 to 5.

The support legs 14 are borne and designed such that in the folded-in state of use (FIG. 9), their outer surfaces 14*a* lie within a cylindrical surface whose diameter corresponds to an outer diameter of the lower shaft section 4*c*, so that the depending on its axial position, sliding sleeve 22 either overlaps only the lower shaft section 4*c* (FIG. 6, 7) or both this as well as the support legs 14 or their outer surfaces 14*a* (FIG. 8, 9) when they are in their folded-up position.

In their maximum folded-out position (FIGS. 3 to 7), the support legs 14 are arranged at a predefined angle 27 in relation to the longitudinal axis 4*d* of the shaft 4, about 30 degrees in the case of the example that is shown, with this angle 27 being set by a limit stop that limits a pivoting movement of the support legs 14.

In the embodiment shown here, the limit stop is formed by an inclined contact surface 14*b* on each support leg 14 on the one hand, and a ring-shaped limit stop 28 on the other hand, which can be held on the bearing element 12 or on the lower shaft section 4*c*, or can be designed in one piece with one of these elements.

Arranged in the area of each bearing journal 18 is a pre-tensioning spring 30, a torsion spring in the example shown here, which is arranged around the bearing journal 18 and which is braced on the one hand against the bearing element 12 and on the other hand against the respective support leg 14. Through this, the support legs 14 are pre-tensioned in the direction towards the folded-out setting-down position (FIG. 7).

Figure 1B:
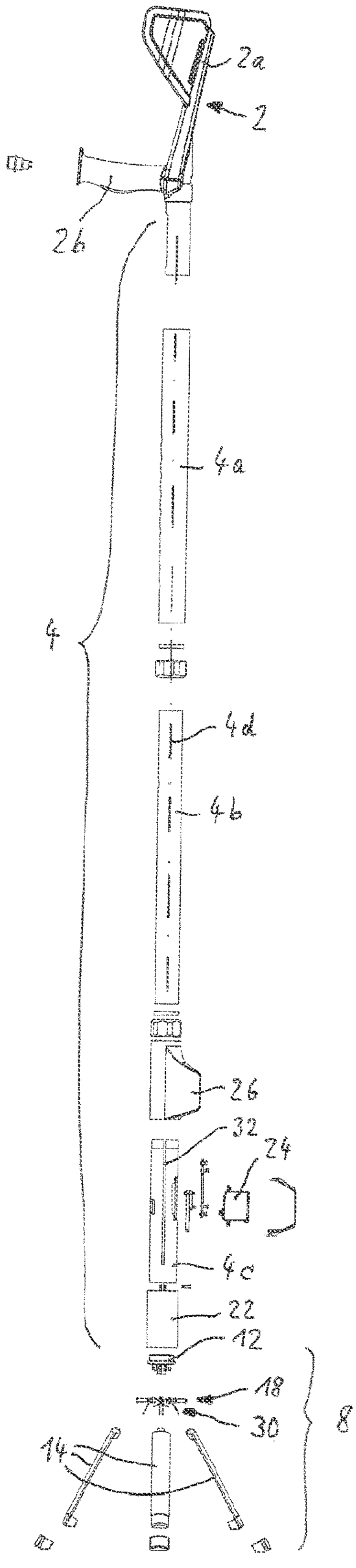
Figure 2:
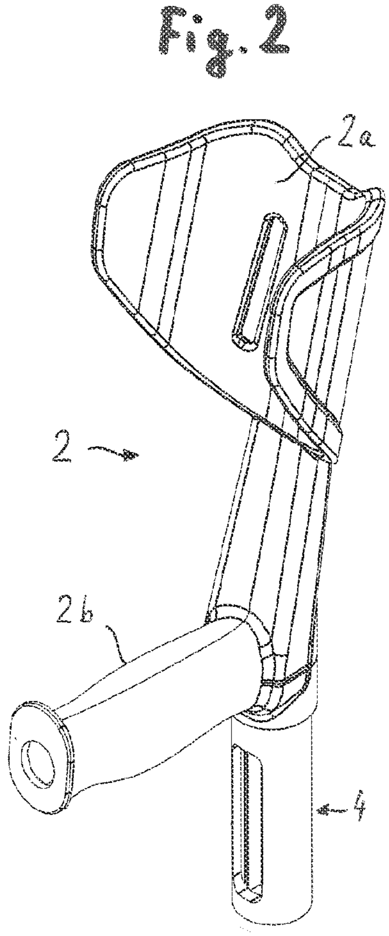
FIG. 2 shows a view of a support upper part of the walking aid according to FIG. 1.

The sliding sleeve 22 is cylindrical and is open on both sides, except for a cross bar 22*c* on an upper end of the sliding sleeve 22, which serves for connection with the drive motor 24. As FIGS. 1*a* and 1*b* show, the lower shaft section 4*c* is equipped with a longitudinal slot 32, in which the cross bar 22*c* is accommodated in a longitudinally movable manner.

Figure 7:
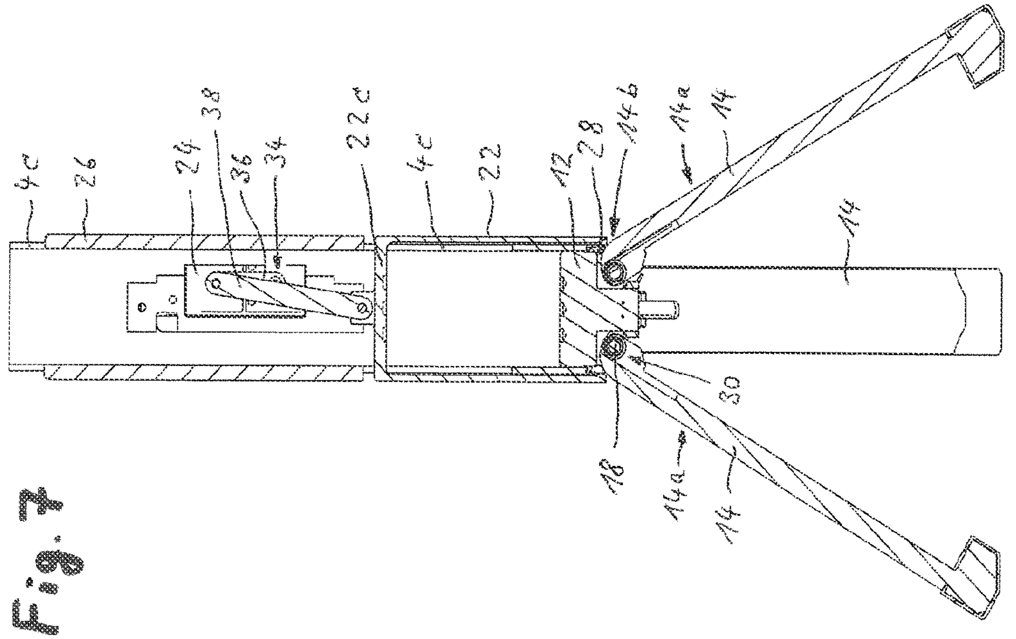
FIG. 7 shows a sectional view along line VII-VII in FIG. 6.

FIGS. 7 to 9 elucidate the drive connection between the sliding sleeve 22 and the drive motor 24. A rotating shaft 34 of the drive motor 24, which can be either the rotational axis of a rotor of the drive motor or an output shaft of a gearbox, is connected to a first crank arm 36 that is connected in an articulated manner to a second crank arm 38, which in turn is articulated on the cross bar 22*c* of the sliding sleeve 22. Through this, a rotational movement of the rotating shaft 34 can be converted into a linear displacement of the sliding sleeve 22 in the longitudinal direction of the lower shaft section 4*c*, between an upper end position in which the sliding sleeve 22 does not overlap the support legs 14 (FIGS. 3 bis 7) and a lower end position in which the sliding sleeve 22 overlaps the support legs and brings them, against the force of the torsion springs 30, into the folded-in position of use (FIG. 9).

Figure 3:
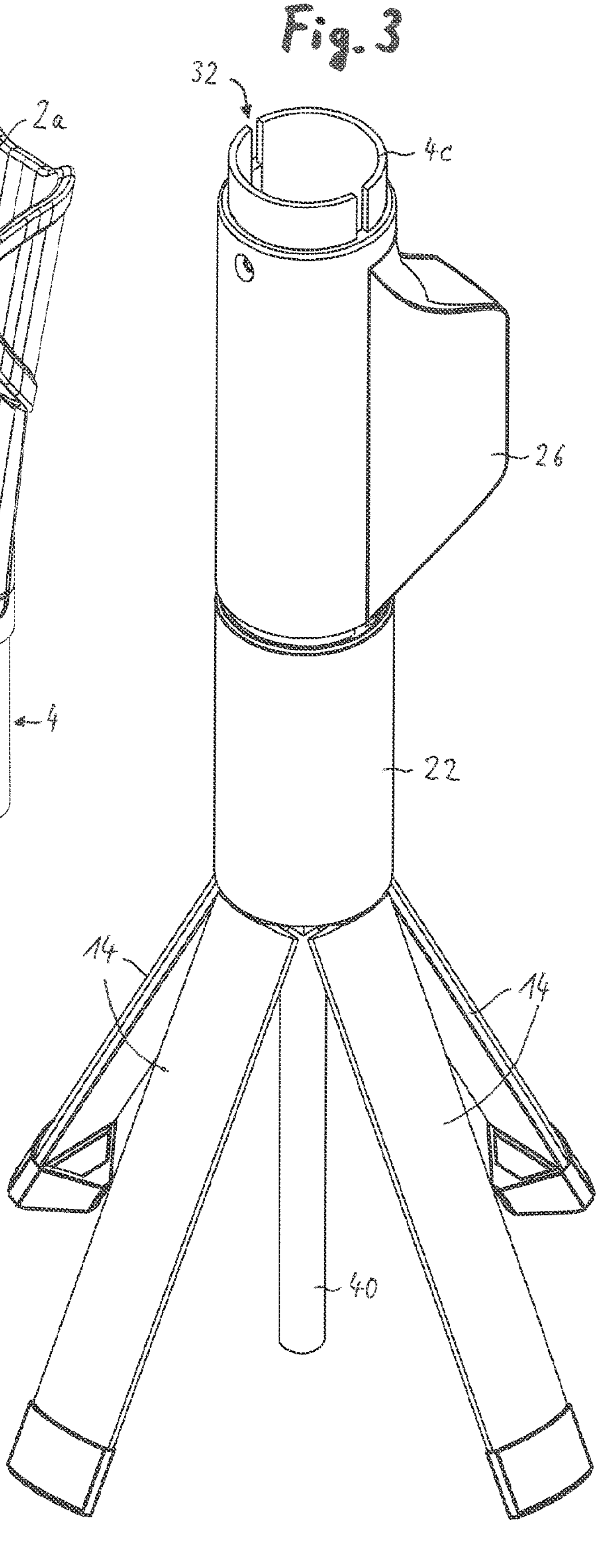
FIG. 3 shows an enlarged perspective view of the support foot and of the lower area of the shaft.
Figure 5:
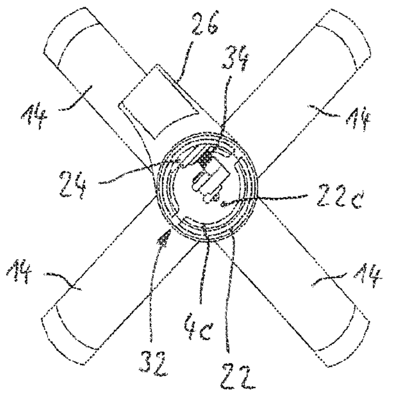
FIG. 5 shows a top view onto the partial area of the walking aid according to FIGS. 3 and 4.
Figure 4:
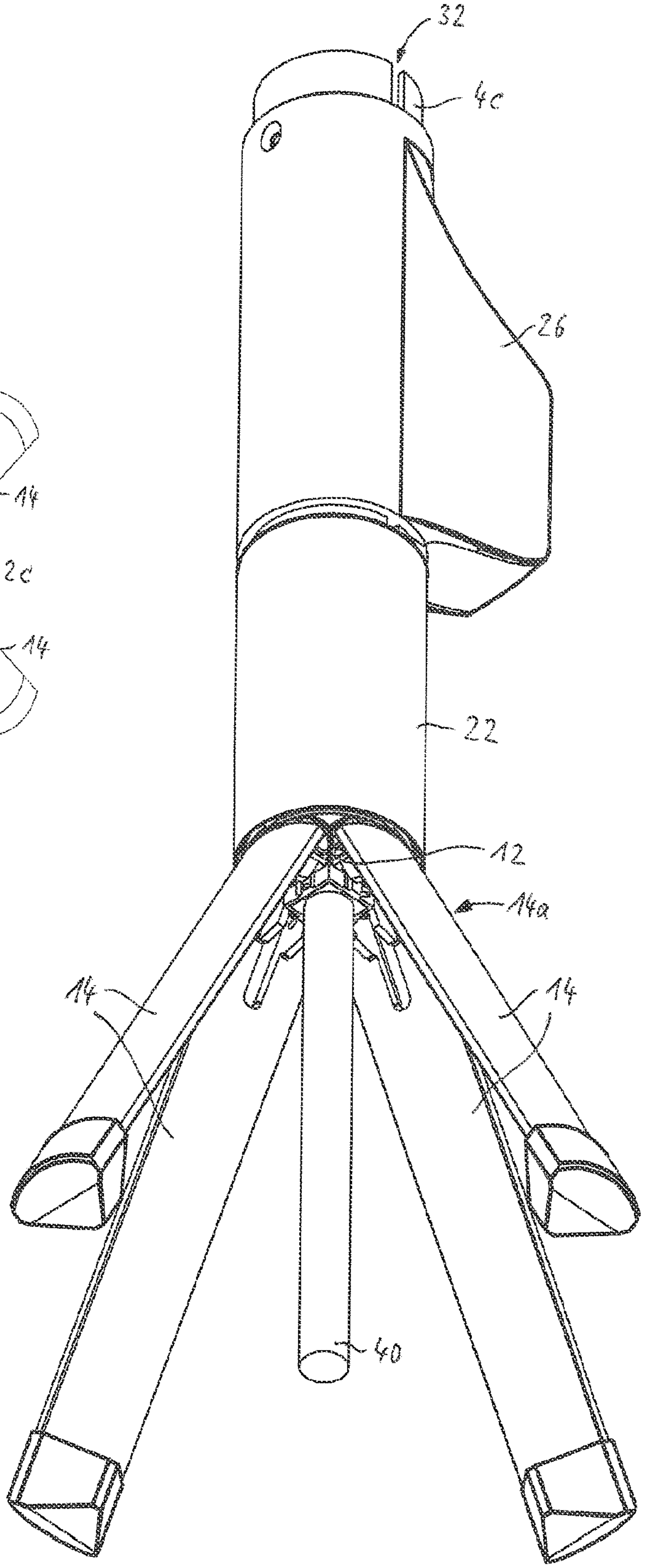
FIG. 4 shows a perspective view from below onto the area shown in FIG. 3.

FIGS. 3 and 4 show a central reinforcement element 40 which is rigidly connected to the lower end of the shaft 4 or to the lower shaft section 4*c*. The reinforcement element 40 has the task of providing additional safety or reinforcement for the support legs 14 in the folded-up position of use, so that the support legs 14 maintain their alignment with the shaft 4 even when subjected to considerable stress crosswise to the longitudinal axis of the shaft 4, and cannot for example buckle crosswise. In the position of use of the support legs 14, in a preferred variant the reinforcement element 40 does not take up any part of the support force acting in the longitudinal direction of the shaft, but this could be envisaged in a variant in order to relieve the support legs.

I claim:

1. A walking aid for taking up an intended supporting force in order to support a person who is using the walking aid, with a support upper part serving for the person to engage with a shaft, a support foot arranged at a lower end of the shaft, and several pivoting support legs which are designed to take up the intended support force in the position of use and which can be moved between a setting-down position, in which they are folded out at a predefined angle and the walking aid can be set down on the ground, and a position of use, in which the support legs are folded together and arranged adjacent to one another and the walking aid can be used, wherein the support foot is formed exclusively by the support legs and the support legs are held in a pivoting manner at the lower end of the shaft, at a specific position that cannot be changed, wherein a sliding sleeve that can be moved in a longitudinal direction of the shaft is arranged at a lower end section of the shaft, wherein in the position of use the sliding sleeve is displaced towards the support foot in order to fold the support legs together and the sliding sleeve at least partially overlaps the support legs from the outside and holds them in the position of use, and in the setting-down position it is displaced, compared with the position of use, towards the support upper part and releases the support legs so that they can fold out, and wherein the sliding sleeve is slidably coupled to the shaft in at least the position of use.

2. A walking aid according to claim 1, wherein arranged between each support leg and the shaft is a limit stop, with which the predefined angle is set.

3. A walking aid according to claim 1, wherein each support leg is held on the shaft such that it can be pivoted around a pivot axis running crosswise to a longitudinal axis of the shaft.

4. A walking aid according to claim 1, wherein the support legs are articulated on a cylindrical bearing element that is set into a lower, hollow end section of the shaft.

5. A walking aid according to claim 1, wherein in that the length of the shaft can be adjusted in a telescopic manner.

6. A walking aid according to claim 1, wherein arranged on or in the hand grip is an operating element for triggering a movement of the support legs into the position of use or into the setting-down position.

7. A walking aid according to claim 1, wherein held on the lower end of the shaft is a central reinforcement element which, in the position of use, is situated centrally between the support legs.

8. A walking aid for taking up an intended supporting force in order to support a person who is using the walking aid, with a support upper part serving for the person to engage with a shaft, a support foot arranged at a lower end of the shaft, and several pivoting support legs which are designed to take up the intended support force in the position of use and which can be moved between a setting-down position, in which they are folded out at a predefined angle and the walking aid can be set down on the ground, and a position of use, in which the support legs are folded together and arranged adjacent to one another and the walking aid can be used, wherein in the position of use, the support foot is formed exclusively by the support legs and the support legs are held in a pivoting manner at the lower end of the shaft, at a specific position that cannot be changed, wherein a sliding sleeve that can be moved in a longitudinal direction of the shaft is arranged at a lower end section of the shaft, wherein in the position of use the sliding sleeve is displaced towards the support foot in order to fold the support legs together and the sliding sleeve at least partially overlaps the support legs from the outside and holds them in the position of use, and in the setting-down position it is displaced, compared with the position of use, towards the support upper part and releases the support legs so that they can fold out, and wherein in or on the shaft is an electric motor as a drive element that is in drive connection with the sliding sleeve.

9. A walking aid according to claim 8, wherein the drive connection is formed by a crank mechanism with a first crank arm on a rotating shaft of the electric motor and a second crank arm which is connected in an articulated manner to the first crank arm, and which is pivoted on the sliding sleeve.

10. A walking aid according to claim 9, wherein a battery and operating elements are accommodated in the support upper part.

11. A walking aid according to claim 10, wherein arranged on the walking aid is an inductive charging unit for wireless charging of the battery.

* * * * *